United States Patent [19]
Repella

[11] 3,871,669
[45] Mar. 18, 1975

[54] ROTARY SHAFT SEAL WITH SHAFT RUNOUT PROTECTION

[75] Inventor: James A. Repella, Madison Heights, Mich.

[73] Assignee: Federal-Mogul Corporation, Southfield, Mich.

[22] Filed: June 14, 1973

[21] Appl. No.: 369,974

[52] U.S. Cl................................. 277/182, 277/153
[51] Int. Cl............................................ F16j 15/32
[58] Field of Search ............ 277/153, 237, 182, 183

[56] References Cited
UNITED STATES PATENTS
2,743,950  5/1956  Helfrecht et al..................... 277/179
3,727,923  4/1973  McEwen............................. 277/153

Primary Examiner—Samuel B. Rothberg
Attorney, Agent, or Firm—Owen, Wickersham & Erickson

[57] ABSTRACT

A rotary shaft seal of the flexible-lip type having a lip body that is joined to a rigid case through an angularly extending flexing section and wherein the sealing lip is expected to encounter significant shaft runout. The sealing lip is given an unusually high shaft interframe. The lip body is provided with a projection that is integral with the lip body and therefore with the lip and with the flexing section. This projection is on the same side of the lip body as the flexing section and lies between it and the lip. The projection provides a portion which is adapted to engage the shaft or to come close to it during shaft runout and thereby to cooperate with the flexing section to prevent too much outward angular thrust of the sealing lip during extreme runout.

5 Claims, 5 Drawing Figures

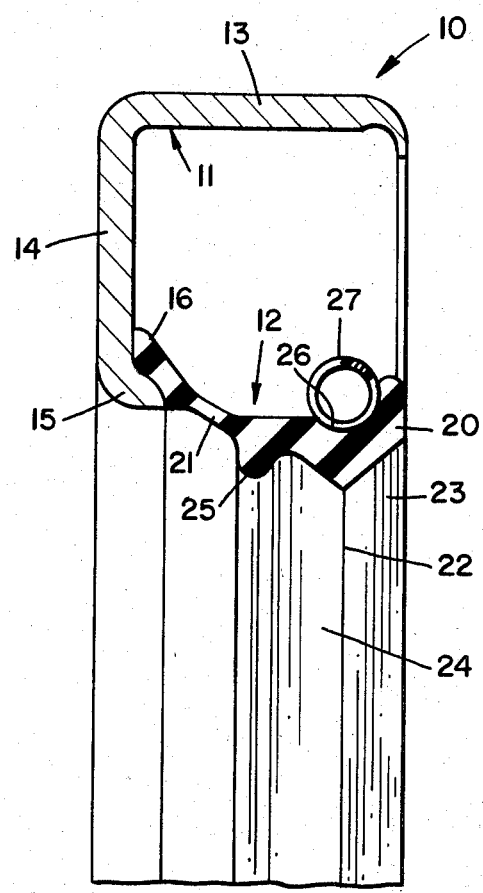
FIG_2
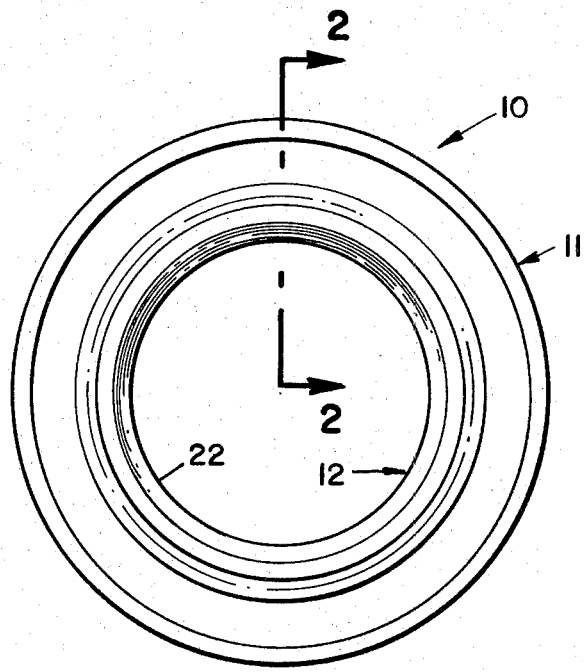
FIG_1
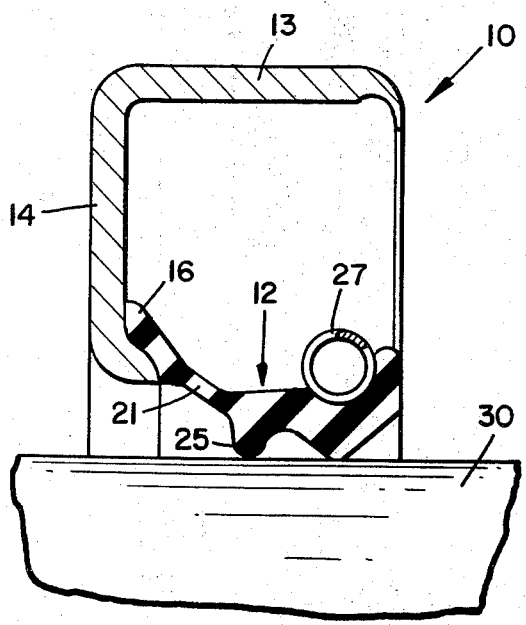
FIG_3
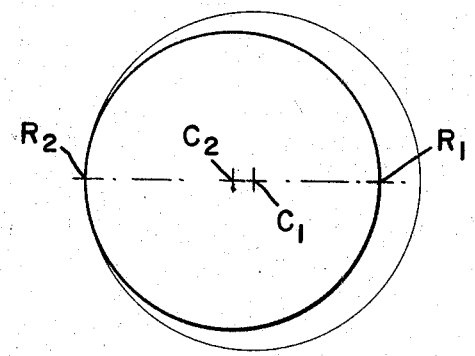
FIG_4

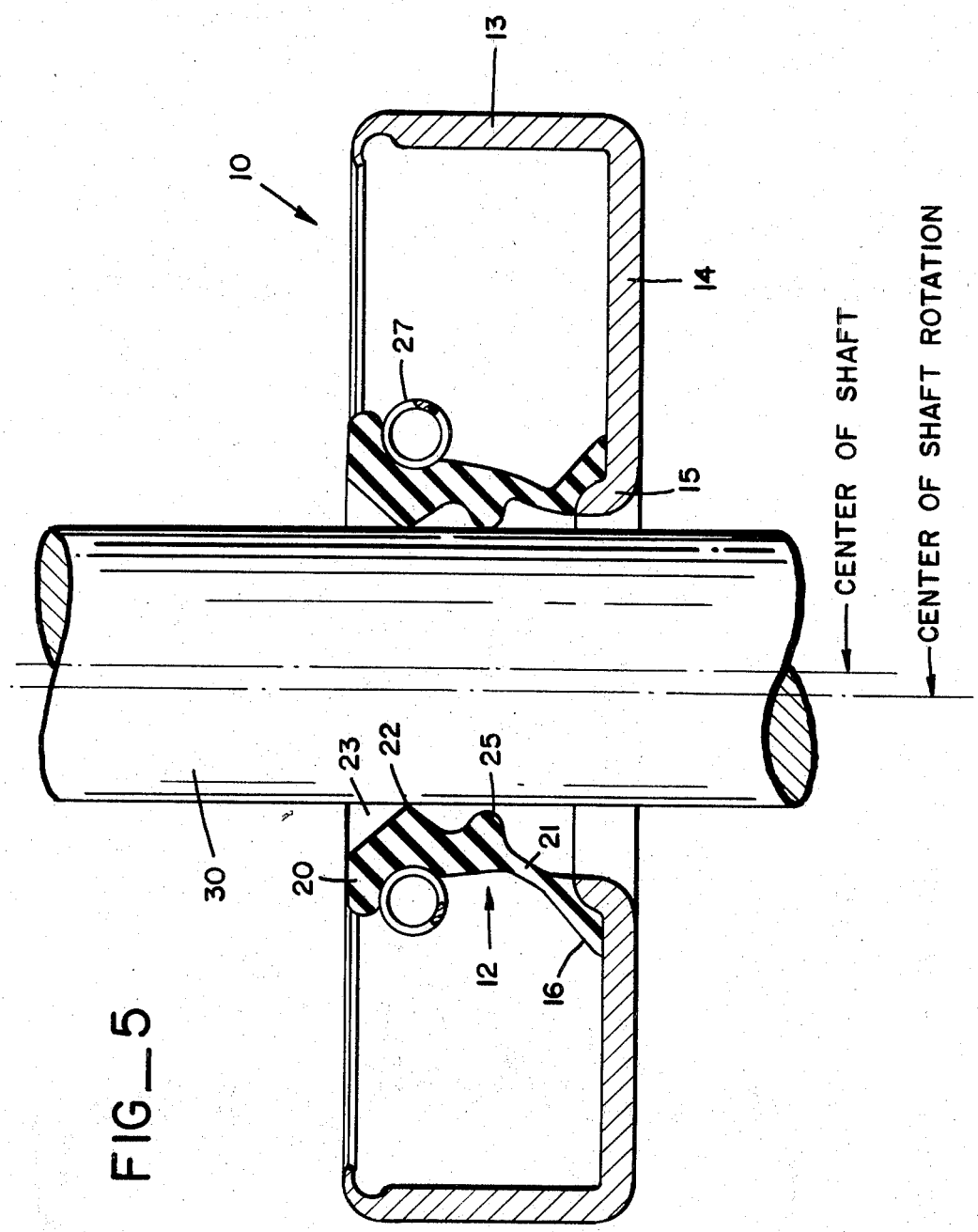

ROTARY SHAFT SEAL WITH SHAFT RUNOUT PROTECTION

BACKGROUND OF THE INVENTION

This invention relates to a shaft seal of the type having a sealing lip which engages the shaft, and it pertains to conditions in which there is significant shaft runout.

Shaft runout is caused by eccentricity or non-roundness of the rotating surface, so that some portions of the rotating surface are further from the center than others, or where the shaft is mounted in such a way that the same result accrues. Under these conditions, the lip which follows the shaft surface is forced at the places of extreme runout to retain contact by cocking the lip body somewhat outwardly. This can continue to the point where the lip is unable to seal, and in the past this has often occurred.

In some instances in the prior art, the seal has been provided with metal or elastomeric members that engage the shaft to limit runout. For example, see the Fred A. Helfrecht U.S. Pat. No. 2,743,950, and also see the Noel S. Reynolds U.S. Pat. Nos. 2,482,029, 2,794,662, 2,797,938, 2,823,966, and 2,966,376. In all of these there is a guide member that is always in contact with the shaft, but the present invention relates to a seal in which the entire problem is solved by a novel structure of the body of the sealing lip and where only the sealing lip normally engages the shaft.

There are, in current use, conventional seals that will handle runout up to 0.025 inch. The degree of runout intended to be handled by the present invention, and which was intended to be handled by the Helfrecht patent referred to above, is in the order of 0.050 inch to 0.100 inch. This is a very different problem. What is good for cases of small runout is no longer good for a large degree of runout, although the converse is not necessarily true.

The Helfrecht Pat. No. 2,743,950 takes an entirely different approach from that of the present invention. Helfrecht provides a seal with a steel ring member and a rubber boot (or projection) so that the entire seal lip (or head) revolves around the same center as the rotating shaft—in other words, there is no runout as between the shaft and the seal head.

SUMMARY OF THE INVENTION

The present invention relates to a seal in which the entire problem is solved by a novel structure of the body of the sealing lip, wherein the lip contact point is designed to have excessive interference with the shaft (around the entire periphery of the shaft) as opposed to earlier designs, so that contact with the shaft is never lost even during extreme inward runout, and wherein a reinforcing annular projection of the air side of the lip cooperates with an angularly extending flexing portion that prevents the seal from being lost at the point of extreme outward runout by preventing the point contact from being flattened. It is not the reinforcing annular projection alone which yields this result, but the projection in combination with the flexing portion.

The point is that with the Helfrecht seal there was actually no relative runout between the seal lip and the shaft. In the present invention, the seal lip axis and the axis of the rotating shaft are not the same, but the seal is structured to handle in a localized manner the extreme runout condition at each point around the periphery of the seal lip. The degree of flexure necessary to accommodate this condition of extreme runout at one point in the periphery of the seal lip has no effect whatsoever on that area of the seal lip periphery which is simultaneously at the condition of least runout.

Viewed more completely, the invention provides a shaft seal having a rigid case to which is bonded an elastomeric sealing member having a lip body provided with the usual sharp lip edge, and which has, in this invention, a diameter small enough relative to the shaft on which it is to be installed, sufficient to assure lip contact even when the shaft is quite eccentric. The lip body is joined to the rigid case through a flexing portion of the elastomeric member; this flexing portion extends frustoconically from the case near the case anchorage to the body; it is thinner than the body and therefore any flexing of the elastomeric member takes place there rather than in the body. Between the sealing lip and the flexing section, the lip body is provided with a projection extending out generally parallel to the sealing lip, but not extending as far radially inwardly. In normal action where the shaft is truly round, this extension will never be engaged by the shaft. However, where there is considerable shaft runout and where the sealing lip is forced to follow that runout, the flexing portion accommodates the swinging out of the lip, and the projection stabilizes the action as it is brought nearer to or even against the shaft. When this projection does engage the shaft, the sealing lip is still able to do the sealing, and the engagement serves to prevent further deleterious action during runout by forcing all radial displacement caused by the rotating shaft to take place in the flexing section and by stabilizing and reinforcing the sealing lip.

BRIEF DESCRIPTION OF THE DRAWINGS

In the drawings:

FIG. 1 is a view in end elevation of a shaft seal embodying the principles of the invention.

FIG. 2 is a view in section taken along the line 2—2 in FIG. 1, showing the shaft seal with its lip in its normal relaxed position before installation on a shaft.

FIG. 3 is a view similar to FIG. 2 showing not only installation on a shaft but also an intermediate position of shaft outward runout in which the lip edge is forced to cock somewhat about a flexing section and in which a projection engages the shaft to stabilize the operation.

FIG. 4 is a reduced view in section of a shaft having runout.

FIG. 5 is a view similar to FIG. 3 showing maximum and minimum conditions of extreme shaft runout.

DESCRIPTION OF A PREFERRED EMBODIMENT

The shaft seal 10 shown in FIGS. 1–3 comprises a rigid case 11 and an elastomeric member 12 bonded to the case 11. Various structures of case 11 may be used, as may various structures of elastomeric member 12. The case 11 shown in the drawings has a cylindrical bore-engaging portion 13 and a radially inwardly-extending flange 14 having an axially inwardly anchor portion 15 at its radially inner extremity, to which the elastomeric member 12 is bonded during its molding by an anchor portion 16.

The elastomeric member 12 has a lip body 20 connected to the anchor portion 16 by a frustoconical-shell flexing portion 21. The lip body 20 comprises a lip 22 which is molded to provide a generally sharp sealing edge and is defined between two frustoconical faces 23 and 24. The face 23 lies on the oil side of the seal and the face 24 lies on the air side of the seal. The face 24 leads toward the flexing portion 21, and in the present invention, is characterized by an annular projection 25 which extends radially inwardly from the face 24 to provide stabilizing action. The lip body 20 also has an annular recess 26 to receive a garter spring 27.

In normal operation, the sealing lip 22 engages a shaft 30 with a small—but substantially more than conventional—amount of shaft interference, and the sealing edge 22 provides the sealing action. This is in contrast to Helfrecht U.S. Pat. No. 2,743,950, which has a minimal amount of interference between the sealing and shaft, because the sealing lip in Helfrecht never really reaches a condition of runout, relatively speaking, in that it follows the shaft. In the seal of the present invention, this is not true, and therefore the sealing lip in the area of least runout (in other words, in the area where there might be a gap were it not for a large degree of initial interference) must be able to expand by about 0.050 inch to 0.100 inch to accommodate the degree of runout. The lip 22 may be widened out under the light pressure exerted by the garter spring 27 and by the shaft interference, and the flattening may continue somewhat during wear but basically the lip 22 is the portion that is doing the sealing.

When a shaft 30 has an extreme amount of runout, as shown in FIGS. 3 and 4, then the lip edge 22 has to follow that shaft 30, and therefore the member 12 has to flex as the shaft 30 rotates. Shaft runout may be due to eccentricity, as shown in FIG. 4, where $C_1$ is the axial center of the bore 30 in which the shaft 30 rotates and $C_2$ is the axial center of the shaft 30. One side $R_1$ of the shaft is always nearer to $C_1$ than the other side $R_2$, and as the shaft 30 rotates, the stationary seal 10 has to accommodate the runout by flexure. With prior art seals, this can result in serious trouble because if the element 12 is cocked out too far, the sealing edge 22 will no longer be the sealing edge and, in prior art seals, the face 24 tends to come against the shaft, with the result that the seal will leak at $R_2$. Also, the edge 22 tends to be pulled away from the shaft at $R_1$ leaving a gap there.

However, in the present invention the face 24 cannot come into engagement with the shaft 30 because of the projection 25, and the projection 25 acts in cooperation with the flexing section 21 to cause the flexing of the element 12 to take place at the flexing section 21 and to bring the projection 25 closer to the shaft 30 when there is such flexing. As a result, the projection 25 can engage the shaft 30 at $R_2$ and thereby stabilize the lip edge 22 and prevent the unwanted flipping out of the seal lip 22 and thereby prevent leakage at $R_2$. Similarly, the extra shaft interference designed into the seal, prevents there being a gap at $R_1$.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A shaft seal including in combination:
   a rigid case having an anchor portion,
   an elastomeric member having an anchor portion bonded to the anchor portion of said case and having a lip body, said lip body being joined to said anchor portion of said elastomeric member through a thin flexing section which is thinner than said body, and comprises a relatively short frustoconical shell,
   said lip body including a sealing lip with an edge and a pair of surfaces meeting at said edge, one siad surface on the air side of the seal and one said surface on the oil side of said seal, the surface on said air side having an annular radially inwardly-extending projection spaced axially from said seal lip and terminating at a normally larger radius than said seal lip and not normally in engagement with a shaft during operation and serving to stablize said seal lip during extreme runout conditions, said projection being an integral portion of said lip body.

2. The shaft seal of claim 1 wherein said lip is provided with an inner periphery relative to the shaft on which it is to be used so as to provide shaft interference sufficient to assure contact at extreme runout radially inwardly.

3. A shaft seal including in combination:
   a rigid case having an anchor portion,
   an elastomeric member having an anchor portion bonded to the anchor portion of said case and having a lip body, said lip body being joined to said anchor portion of said elastomeric member through a thin flexing section which is thinner than said body, and is a short frustoconical shell extending radially inwardly from said anchor portion,
   said lip body including a sealing lip with an edge and a pair of faces converging toward such sealing edge, one face on the air side of the seal and one face on the oil side of said seal, the face on said air side having an annular projection extending inwardly terminating in a rounded radially inner edge spaced axially from said seal lip and located at a normally larger radius than said seal lip and serving to stabilize said seal lip during extreme runout conditions, said projection being an integral portion of said body.

4. The shaft seal of claim 3 wherein said lip edge has a periphery substantially smaller than the shaft it is to engage, so that contact at all positions is assured.

5. An installation comprising:
   a machine part having a bore,
   a shaft rotating somewhat eccentrically in said bore, and
   a shaft seal sealed to said bore and concentric therewith and including in combination:
   a rigid case having an anchor portion spaced radially from said shaft,
   an elastomeric member having an anchor portion bonded to the anchor portion of said case and having a lip body, said lip body being joined to said anchor portion of said elastomeric member through a thin flexing section which is thinner than said body and which extends in radially inwardly from said anchor portion as a short frustoconical shell attached to said lip body,
   said lip body including a sealing lip with an edge having a periphery small enough to assure sealing contact with said shaft at all points, and having a radially inner face on the air side of the seal with an annular projection extending toward said shaft and axially spaced from said seal lip and located at a normally larger radius than said seal lip so that it is not normally in contact with said shaft and serving to stabilize said seal lip during extreme runout conditions, said projection being an integral portion of said body.

* * * * *